March 8, 1927.
W. I. FERRIS
1,620,529
FOUNTAIN PEN AND STAND THEREFOR
Filed May 27, 1926
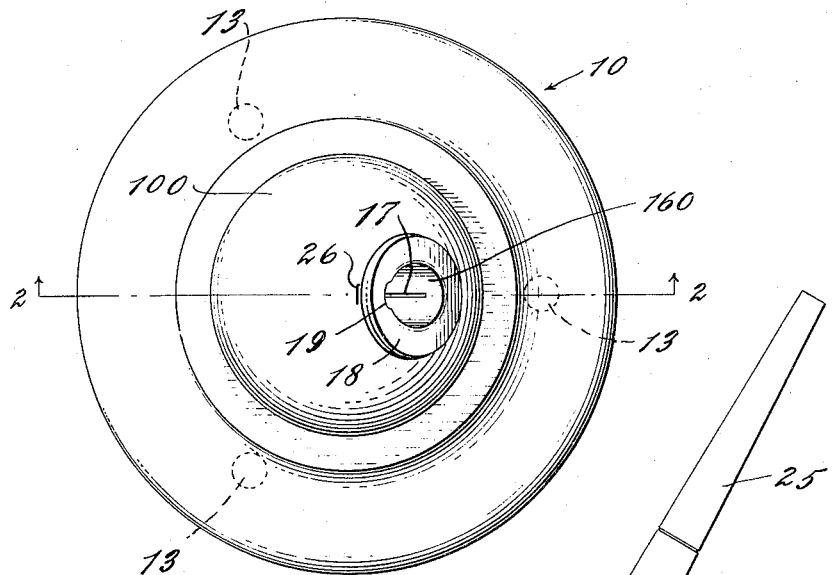
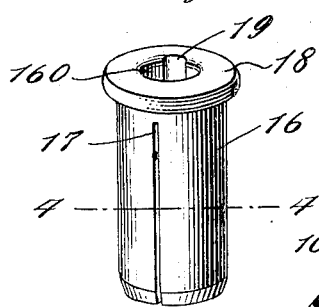
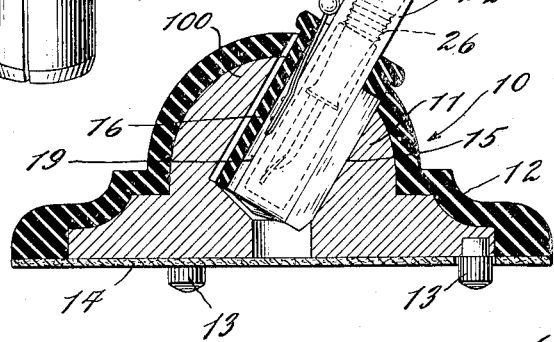
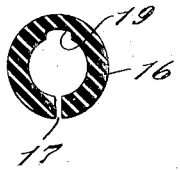
INVENTOR.
William I. Ferris
BY
ATTORNEYS Patented Mar. 8, 1927.

1,620,529

UNITED STATES PATENT OFFICE.

WILLIAM I. FERRIS, OF WESTFIELD, NEW JERSEY, ASSIGNOR TO L. E. WATERMAN COMPANY, OF NEW YORK, N. Y., A CORPORATION OF NEW YORK.

FOUNTAIN PEN AND STAND THEREFOR.

Application filed May 27, 1926. Serial No. 111,961.

My invention particularly relates to a fountain pen and stand wherein the fountain pen is readily accessible when used with the stand, and may also be carried in the pocket in the usual manner.

My invention will best be understood by reference to the accompanying drawing in which Figure 1 is a plan view of a stand embodying a portion of my invention; Fig. 2 is a section taken along the line 2—2 of Fig. 1 and illustrates a fountain pen in position in the stand; Fig. 3 is a perspective view of a sleeve which, in one form, is received in an opening in the stand and Fig. 4 is a section taken along the line 4—4 of Fig. 3.

Like reference characters indicate like parts throughout the drawings.

Referring now to the drawing 10 indicates generally a stand preferably having a flat base as indicated in Fig. 2, the top portion of the stand, in the form illustrated, having an irregular contour including a dome-shaped top 100, although it will, of course, be understood that the upper portion of the stand may be formed with any desired contour. In the embodiment illustrated, the portion 10 of the stand is formed of suitable material which is preferably metal particularly when the stand is to be weighted. The portion 11 of the stand is, in the embodiment illustrated, covered with a layer 12 of suitable material such as rubber, although it will, of course, be understood that the stand may be formed of a single piece of material. The stand is preferably provided with suitable legs 13 and a layer 14 of felt or other suitable material is secured to the lower side thereof.

The stand is provided with a suitable opening 15 which, as here shown, is cylindrical in shape and preferably inclined to the vertical. In the embodiment illustrated, a sleeve 16 of hard rubber or other suitable material is received in the opening 15, and forms a close fit therein, the sleeve preferably being split, as at 17, for at least a portion of its length so that the lower portion thereof will have more or less resiliency, and so that the sleeve will be frictionally retained in the opening 15 in the base. The top of the sleeve 16 is preferably provided with a flange 18, the upper end of the slit 17 preferably being short of the flange as illustrated in Fig. 3. The sleeve 16 is provided with an opening 160 adapted to receive the end of a fountain pen, and in the embodiment illustrated, is adapted to receive the cap thereof. The wall of the sleeve surrounding the opening 160 is provided with a groove 19 extending longitudinally of the sleeve and which is adapted to receive the end of a fountain pen which I have indicated generally at 20. In the embodiment illustrated, the cap 22 of the pen is received in the opening 15 and the clip 23 which is secured to the cap in the usual manner is adapted to be received in the groove 19 and thereby prevent the cap from turning relatively to the stand when the same is in position therein. The fountain pen also comprises the usual ink reservoir 24 and the top of the pen, in the form shown, is provided with a removable portion 25 for the purpose of shortening the pen should this be desired. The lower end of the ink reservoir is provided with screw threads which engage screw threads formed in the cap, as at 26, in a known manner. It is to be understood, however, that the screw threads may be omitted, and that the end of the cap may be placed outwardly if desired.

Assuming that it is desired to use the fountain pen when the same is in position in the stand, as illustrated in Fig. 2, the reservoir is unscrewed from the cap 22, the engagement of the clip of the cap preventing movement of the cap relatively to the stand. My invention, therefore, provides a device in which the fountain pen is always available for use, and the cap together with the stand protects the pen point both from injury and from the influence of the air. When it is desired to carry the pen, the entire pen is moved longitudinally from the opening in the stand, the tip 25 of the pen being removed if it is desired to shorten the same.

By providing a sleeve of the general character indicated, I am enabled to provide a stand that will accommodate fountain pens of different size merely by changing the bore of the sleeve and supplying a sleeve that is adapted to receive the end of a fountain pen of a desired size.

While I have illustrated and prefer to supply a sleeve, it is to be understood that the wall surrounding the opening in the base may itself be provided with a groove adapted to receive the clip, and in Figs. 1 and 2, I have shown the wall surrounding the opening 15 provided with a groove 26 so that the opening 15 itself can receive the end of the fountain pen, the clip of the pen engaging the groove 26.

I claim:

1. A stand for a fountain pen comprising a recess adapted to receive an end of a fountain pen, the wall of said recess being formed with a groove adapted to receive the pen clip.

2. A stand for a fountain pen formed with a recess, a sleeve adapted to fit therein and formed with an opening adapted to receive the end of a fountain pen, the wall surrounding said opening being provided with a groove adapted to receive the pen clip.

3. A stand for a fountain pen formed with a recess, a sleeve adapted to fit therein and formed with an opening adapted to receive the end of a fountain pen and split longitudinally for at least a portion of its length whereby the sleeve may be frictionally retained in said opening.

4. A stand for a fountain pen formed with a recess, a sleeve adapted to fit therein and formed with an opening adapted to recieve the end of a fountain pen and split longitudinally for at least a portion of its length whereby the sleeve may be frictionally retained in said opening, the upper end of said sleeve being provided with a flange.

5. A stand for a fountain pen formed with a recess, a sleeve adapted to fit therein and formed with an opening adapted to receive the end of a fountain pen and split longitudinally for at least a portion of its length whereby the sleeve may be frictionally retained in said opening, the wall surrounding said opening being provided with a groove adapted to receive the pen clip.

6. In combination, a stand comprising an opening, the wall surrounding which is provided with a longitudinally extending groove, and a fountain pen provided with a clip, the end of the pen being adapted to be received in said opening and said clip being adapted to be received in said groove.

7. In combination, a stand comprising an opening, the wall surrounding which is provided with a longitudinally extending groove, and a fountain pen comprising a cap provided with a clip, said cap being adapted to be received in said opening and said clip being adapted to be received in said groove.

8. In combination, a stand comprising an opening, the wall surrounding which is provided with a longitudinally extending groove, a fountain pen comprising a cap provided with a clip, and an ink receptacle having a screw threaded engagement with the cap, said cap being adapted to be received in said opening and said clip being adapted to be received in said groove.

WILLIAM I. FERRIS.